US012264503B2

(12) United States Patent
Walls et al.

(10) Patent No.: US 12,264,503 B2
(45) **Date of Patent: *Apr. 1, 2025**

(54) ADJUSTMENT PLATE GAUGE INSERT AND ADAPTER FOR HANDS-FREE LOCK INSTALLATION

(71) Applicant: Schlage Lock Company LLC, Carmel, IN (US)

(72) Inventors: Brian E. Walls, Arlington, WA (US); Rich D. Shelinbarger, Colorado Springs, CO (US); Scott D. Welsby, Colorado Springs, CO (US); Peter Malenkovic, Monument, CO (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,965

(22) Filed: Aug. 1, 2023

(65) Prior Publication Data

US 2024/0175297 A1 May 30, 2024

Related U.S. Application Data

(63) Continuation of application No. 17/136,388, filed on Dec. 29, 2020, now Pat. No. 11,713,595, which is a (Continued)

(51) Int. Cl.
*E05B 55/00* (2006.01)
*E05B 9/08* (2006.01)

(Continued)

(52) U.S. Cl.
CPC .............. *E05B 55/005* (2013.01); *E05B 9/08* (2013.01); *E05B 63/006* (2013.01); *E05B 63/10* (2013.01); *Y10T 292/62* (2015.04)

(58) Field of Classification Search
CPC ........ E05B 55/005; E05B 9/08; E05B 63/006; E05B 63/10; Y10T 292/62
See application file for complete search history.

(56) References Cited

U.S. PATENT DOCUMENTS 3,899,907 A 8/1975 Prahl
3,992,908 A 11/1976 Crepinsek (Continued)

OTHER PUBLICATIONS

Canadian Office Action; Canadian Intellectual Property Office; Canadian Patent Application No. 3,015,258; May 30, 2019; 3 pages.

(Continued)

*Primary Examiner* — Mark A Williams
(74) *Attorney, Agent, or Firm* — Taft Stettinius & Hollister LLP

(57) ABSTRACT

A door lock chassis has a gauge insert that defines different dimensions corresponding to different door thicknesses. The gauge insert is positionable in the lock chassis in different orientations corresponding to the different dimensions used to align the lock chassis for different door thicknesses. Additionally, a door lock may include an anti-rotation assembly for preventing rotation of the lock chassis. The anti-rotation assembly may include a retention member that is secured to an inside hub of a lock chassis. As an anti-rotation member is displaced in a first axial direction along the inside hub to a mount position, the anti-rotational member may deflect resilient members of the retention member. With the anti-rotation member at the mounted position, the anti-rotation member may be in a frictional engagement with the previously deflected resilient members so that anti-rotation member is retained at the mount position.

18 Claims, 9 Drawing Sheets

Related U.S. Application Data continuation of application No. 15/671,778, filed on Aug. 8, 2017, now Pat. No. 10,876,323, which is a continuation of application No. 14/212,892, filed on Mar. 14, 2014, now Pat. No. 9,725,928.

(60) Provisional application No. 61/793,214, filed on Mar. 15, 2013.

(51) Int. Cl.

*E05B 63/00* (2006.01)

*E05B 63/10* (2006.01)

(56) References Cited

U.S. PATENT DOCUMENTS

| | | | |
|---|---|---|---|
| 4,272,974 A | 6/1981 | Hennessy | |
| 4,573,334 A | 3/1986 | Crepinsek | |
| 4,744,232 A | 5/1988 | Shen | |
| 5,083,823 A | 1/1992 | Fann et al. | |
| 5,533,368 A | 7/1996 | Eagan | |
| 5,598,726 A | 2/1997 | Cordle | |
| 5,845,522 A | 12/1998 | Shen | |
| 6,279,360 B1 | 8/2001 | Shen | |
| 6,302,457 B1 | 10/2001 | Shen | |
| 6,364,383 B1 | 4/2002 | Shen | |
| 6,508,092 B1 | 1/2003 | Aabs et al. | |
| 7,475,578 B2 | 1/2009 | Brown et al. | |
| 9,518,812 B2 | 12/2016 | Badhya | |
| 10,619,387 B2 | 4/2020 | Ou et al. | |
| 2001/0023600 A1 | 9/2001 | Pompeii | |
| 2002/0116965 A1 | 8/2002 | Bates et al. | |
| 2003/0121300 A1 | 7/2003 | Wang | |
| 2007/0096479 A1 | 5/2007 | Lin et al. | |
| 2010/0139225 A1 | 6/2010 | Mammarella et al. | |
| 2010/0139335 A1 | 6/2010 | Constantinou | |
| 2011/0219832 A1 | 9/2011 | Lin | |
| 2011/0302971 A1 | 12/2011 | Bui | |
| 2012/0200095 A1 | 8/2012 | Wang et al. | |
| 2012/0267907 A1* | 10/2012 | Rudhager | E05B 3/04 292/348 |
| 2013/0234453 A1 | 9/2013 | Murphy et al. | |
| 2014/0238180 A1 | 8/2014 | Huang et al. | |
| 2014/0265376 A1 | 9/2014 | Walls et al. | |

OTHER PUBLICATIONS

Canadian Office Action (Second); Canadian Intellectual Property Office; Canadian Patent Application No. 3,015,258; Feb. 6, 2020; 3 pages.

Canadian Examination Report; Canadian Intellectual Property Office; Canadian Patent Application No. 3,133,549; Dec. 5, 2022; 3 pages.

* cited by examiner

ADJUSTMENT PLATE GAUGE INSERT AND ADAPTER FOR HANDS-FREE LOCK INSTALLATION

CROSS REFERENCE TO RELATED APPLICATIONS

The present application is a continuation of U.S. patent application Ser. No. 17/136,388 filed Dec. 29, 2020 and issued as U.S. Pat. No. 11,713,595, which is a continuation of U.S. patent application Ser. No. 15/671,778 filed Aug. 8, 2017 and issued as U.S. Pat. No. 10,876,323, which is a continuation of U.S. patent application Ser. No. 14/212,892 filed Mar. 14, 2014 and issued as U.S. Pat. No. 9,725,928, which claims the benefit of U.S. Provisional Patent Application Ser. No. 61/793,214 filed Mar. 15, 2013, the contents of each application incorporated herein by reference in their entirety.

TECHNICAL FIELD

The present application relates to cylindrical locksets and more particularly, but not exclusively, to the installation of such locksets in doors of varying thickness.

BACKGROUND

Cylindrical locksets typically include a cylindrical lock chassis having a transverse centerline. During installation, regardless of the thickness of the door in which the lockset is being installed, the transverse centerline of the lock chassis should usually coincide with the centerline of the door thickness. If this installation criterion is not met, the lockset may fail to function properly. Therefore, a lock chassis may have an adjustable configuration that allows the lock chassis to be appropriately aligned with a variety of door thicknesses. For example, the position of the lock body relative to an associated mounting plate or mounting flange may be adjustable. Yet, difficulties in making accurate assessments of the current door thickness setting, or of distinguishing between alternative settings, can lead to use of incorrect settings and wasted effort. Likewise, the occurrence of inadvertent changes from factory preset conditions during shipping or handling can lead to errors or necessitate additional steps of validation and correction.

Cylindrical locksets may also have an installation step in which an anti-rotation plate or other securing member is placed over the lock chassis, held into place by the installer's hand, and then secured to the door by suitable screws or bolts. If the anti-rotation member or securing member is not held in place by the installer's hand, the anti-rotation member may slide off from the lock chassis, causing delay and wasted effort. Conversely, if the installer holds the securing member in place, then one or both of the installer's hands are occupied and thus the installer is less free to install remaining components of the lockset.

BRIEF SUMMARY

Embodiments of the present invention provide a door lock chassis having a gauge insert that defines different dimensions corresponding to different door thicknesses such that, when the gauge insert is inserted into the door lock chassis at a particular orientation, a dimension of the gauge insert corresponding to that orientation aids in adjusting the lock chassis for an associated door thickness. Moreover, according to certain embodiments, the gauge insert has multiple dimensions where each dimension corresponds to a different door thickness and, when properly oriented, can correctly align the lock chassis for that particular door thickness. Additionally, according to certain embodiments, the lock chassis has a retention mechanism that retains an anti-rotation member on the lock chassis so that an installer is free from having to hold the anti-rotation member or plate on the lock chassis in subsequent assembly procedures. The retention mechanism is received into a lock chassis housing and does not require screws, bolts, or the like to retain the anti-rotation member to a lock chassis during assembly of the lock mechanism.

Additionally, an aspect of the present invention is a door lock chassis that is adapted to be mounted within doors having different thicknesses. The door lock chassis includes a lock body and an adjustment plate that is adapted to be adjustably mounted to the lock body. The door lock chassis also includes a removable gauge insert that is adapted to frictionally engage the adjustment plate and to be received in the slot at one of a plurality of positive stop arrangements. Further, each of the plurality of positive stop arrangements are configured to, when the adjustment plate is operably mounted to the lock body, separate the adjustment plate from a portion of the lock body by an axial distance. Additionally, the axial distance is different for each of the plurality of positive stop arrangements.

Another aspect of the present invention is a door lock chassis that is adapted to be mounted within doors having different door thicknesses. The door lock chassis includes a body portion having at least one slot and an adjustment plate that is adapted to be adjustably mounted to the lock body. Further, the at least one gauge insert is adapted to be removably received in the at least one slot and a first portion and a second portion. The first portion is adapted to provide an axial position for the adjustment plate relative to at least the body portion. The second portion is adapted to frictionally engage the adjustment plate so as to resist movement of the adjustment plate away from the axial position.

Another aspect of the present invention is an anti-rotational assembly for a door lock having a lock chassis. The anti-rotational assembly includes an inside hub of the lock chassis that has a receptacle that includes a cavity and a pair of channels. The pair of channels are configured to longitudinally extend along opposing sides of the cavity. The anti-rotational assembly also includes a retention member that has a base and one or more resilient members. The base has a pair of lips that are adapted to be slidingly received in the pair of channels. Additionally, the anti-rotational assembly includes an anti-rotation member that is configured for a sliding engagement with the one or more resilient members in a first axial direction as the anti-rotation member is displaced to an mount position relative to the inside hub. The anti-rotation member is also configured for a frictional engagement with the one or more resilient members to retain the anti-rotation member in the mount position.

Additionally, a further aspect of the present invention is an anti-rotational assembly for a door lock having a lock body. The anti-rotational assembly includes an inside hub of the lock body that has an outer section. The anti-rotational assembly also includes a retention mechanism that is secured to the inside hub and which has one or more resilient members. The anti-rotation member is configured to deflect the one or more resilient members as the anti-rotation member is displaced in a first axial direction, and to be retained in a mount position on the inside hub by a frictional engagement with the one or more resilient members.

Other aspects of the present invention will become apparent by consideration of the detailed description and accompanying drawings.

Figure 1:
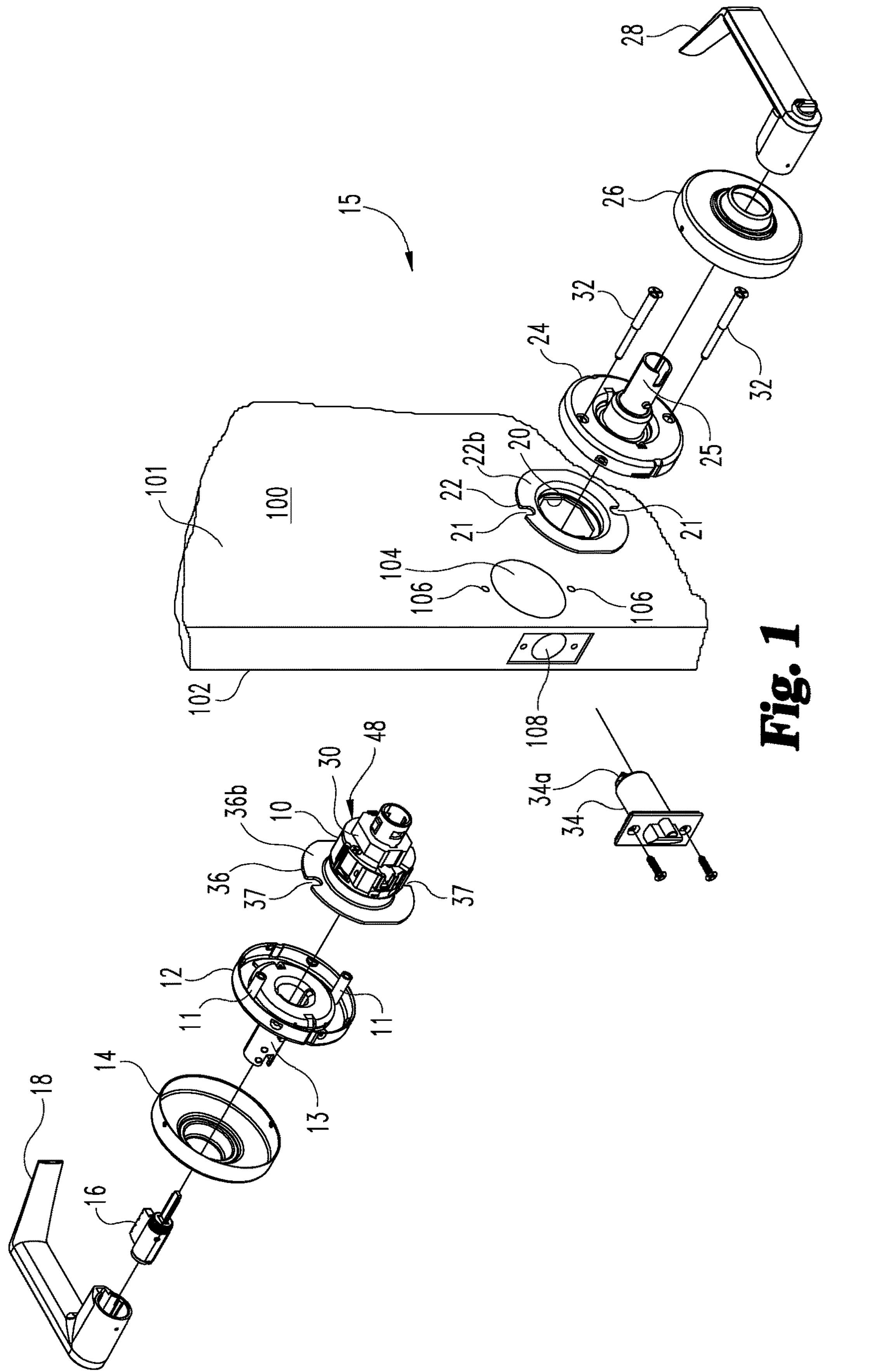
FIG. 1 illustrates an exploded perspective view of a cylindrical type lock assembly according to an embodiment of the present invention that is installed in a door.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF REPRESENTATIVE EMBODIMENTS

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

Figure 2:
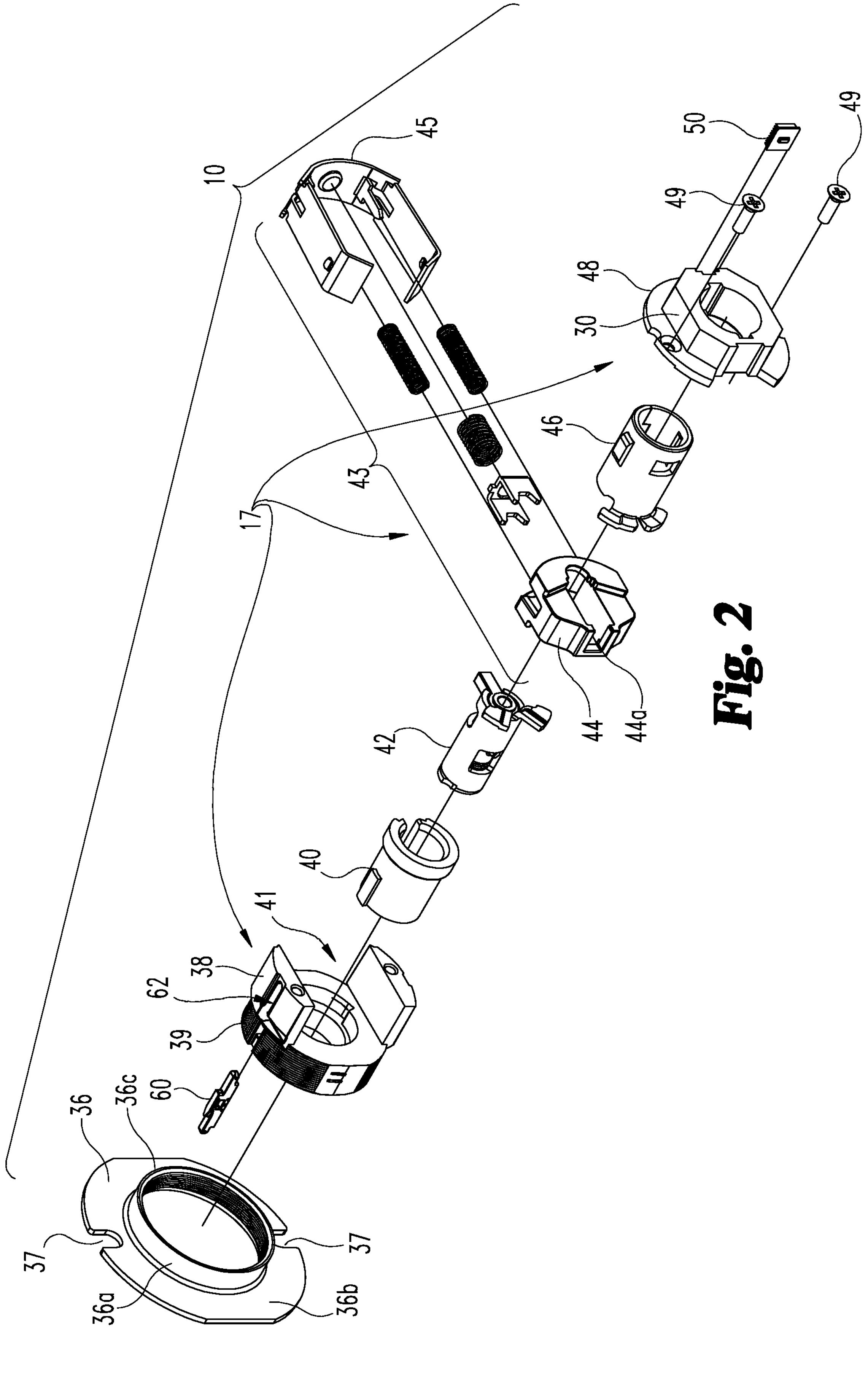
FIG. 2 illustrates an exploded perspective view of a lock chassis for a lock assembly according to an embodiment of the present invention.

Turning to the figures, FIG. 2 is an exploded view of an adjustable lock chassis 10 according to an embodiment, and FIG. 1 is an exploded view of the installation of a lock assembly 15, which includes the lock chassis 10, in a door 100. The door 100 has a cylindrical hole 104 and two smaller mounting holes 106 that extend through the thickness of the door from the inside face 101 to the outside face 102. The door 100 also has a latch hole 108 that extends from the side edge of the door 100 to the cylindrical hole 104.

The lock chassis 10 includes a body portion 17 comprising an outside housing or first hub 38 and an inside hub or second hub 48, and a slide assembly 43 including a slide 44 and a slide clip 45. The slide assembly 43 is located in a slot 41 of the outside housing 38. An outside spindle 40 and key cam assembly 42 are rotably captured in the outside housing 38 so as to be in operable engagement with an outside portion of the slide assembly 43. An inside spindle 46 is rotably captured in the inside hub 48 so as to be in operable engagement with the inside of the slide assembly 43. The inside hub 48 is secured to the outside housing 38 via mounting screws 49.

Figure 3:
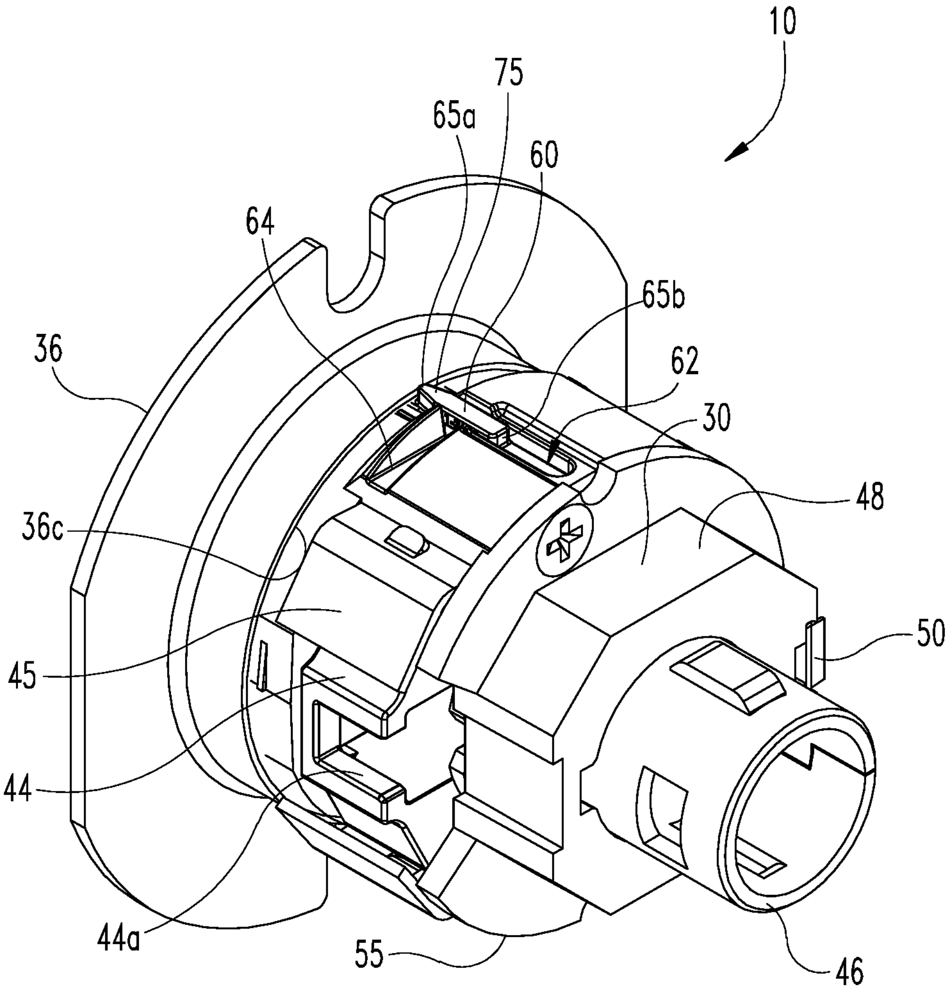
FIG. 3 illustrates a perspective view of the lock chassis shown in FIG. 2.
Figure 4:
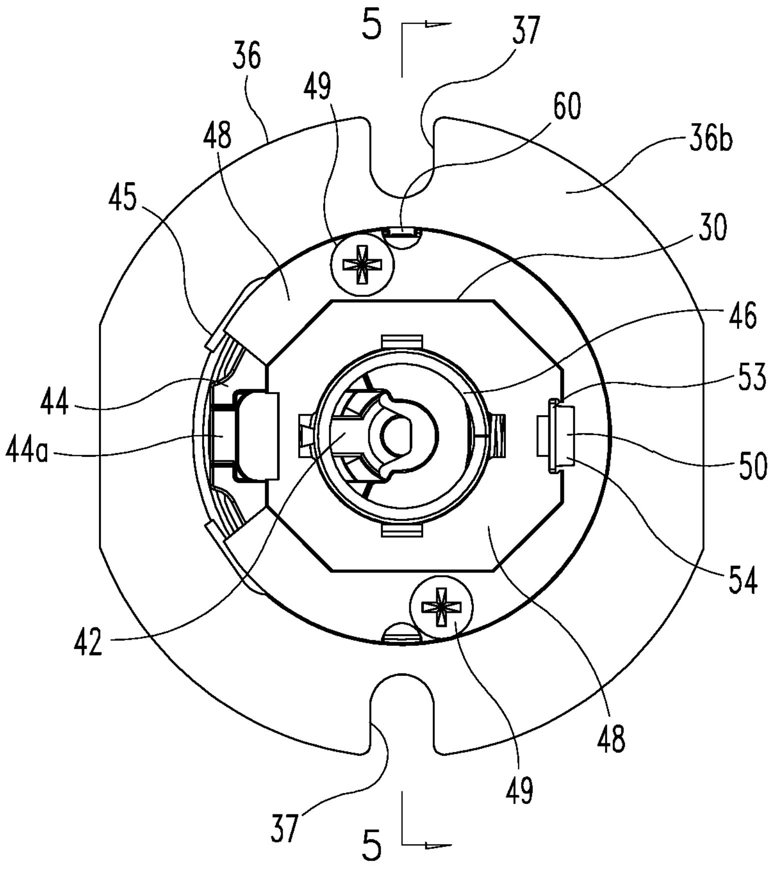
FIG. 4 illustrates an end elevational view of the lock chassis shown in FIG. 2.

In the illustrated embodiment, the lock chassis 10 includes an adjustment plate 36, which includes an annular portion **36*a* and a flange 36*b*. The annular portion 36*a* has interior threads and is threaded on the outside portion 39 of outside housing 38 which is provided with exterior threads. A gauge insert 60 to be described in greater detail below is positioned within a slot 62 of the outside housing 38. As shown in FIG. 3, a positive stop 65*a* of the gauge insert 60 contacts an inside edge 36*c* of the annular portion 36*a* of the adjustment plate 36 in a positive stop arrangement indicative of a proper axial position of the adjustment plate 36** for a corresponding door thickness.

Figure 5:
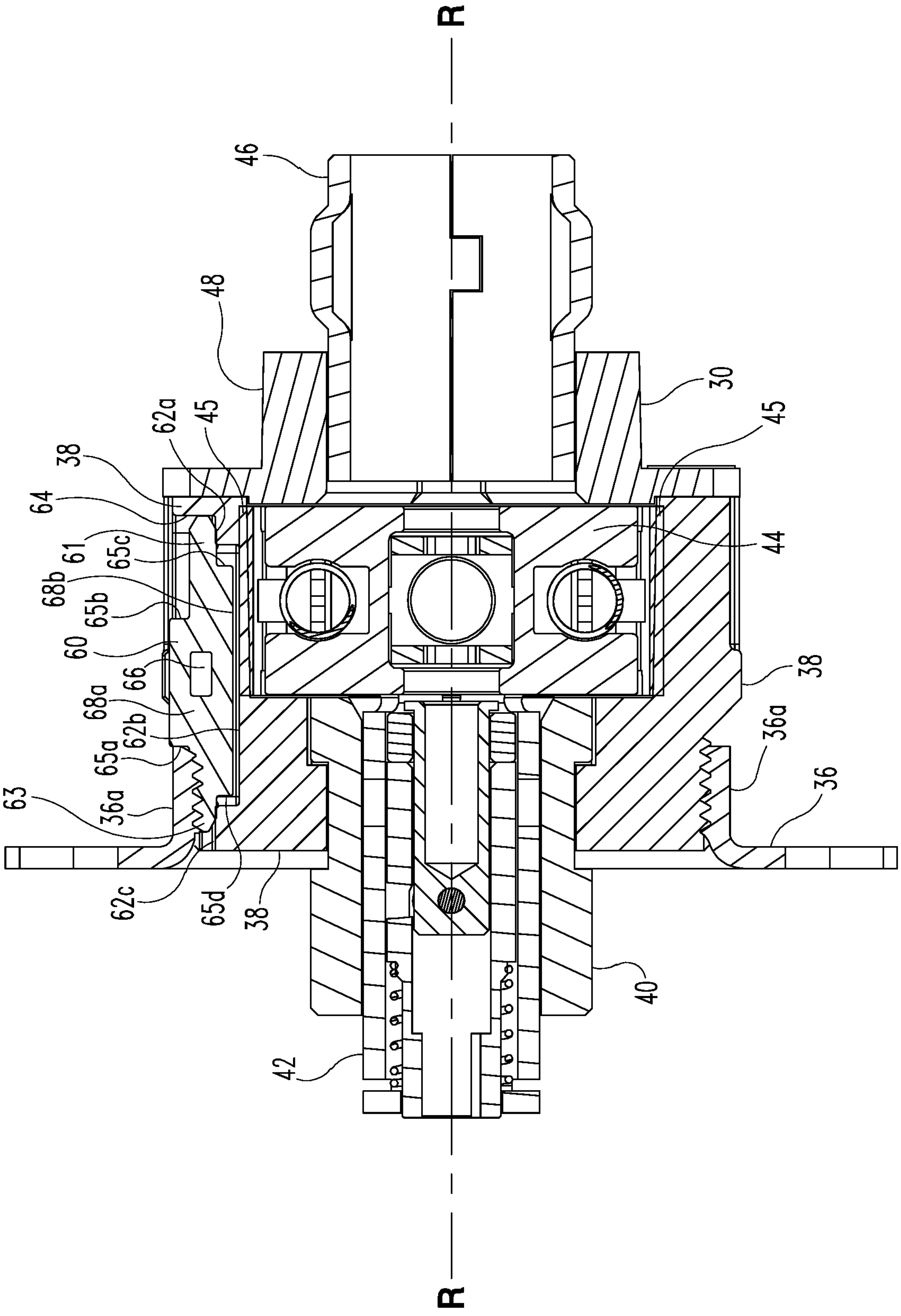
FIG. 5 illustrates a cross sectional view of a lock chassis 2 as taken along the line 5-5 in FIG. 4.

As shown in the FIG. 5 embodiment, a leg 63 of the gauge insert 60 frictionally engages the interior threads of the annular portion **36*a* of the adjustment plate 36. This frictional engagement provides resistance against rotation of the adjustment plate 36, which reduces the chance that the position of the adjustment plate 36** is inadvertently changed.

Referencing FIGS. 1 and 2, during assembly of the lock assembly 15, the latch 34 is first positioned in the latch hole 108 so as to have the tail piece **34*a* extending into the cylindrical hole 104. Then, the lock chassis 10 is inserted into the cylindrical hole 104 such that the tail piece 34*a* of the latch 34 engages the engagement part 44*a* of the slide assembly 43 of the lock chassis 10. Flange 36*b* rests against the outside face 102 of the door 100 and has slots 37 aligned with the mounting holes 106 in the door 100. An anti-rotation plate 22, which has an interior opening 20 shaped to correspond to the shape of an outside section 30 of the inside hub 48, is placed over the outside section 30. Flange 22*b* of the anti-rotation plate 22 rests against the inside face 101 of the door 100 and has slots 21 aligned with the mounting holes 106 of the door 100**.

FIG. 2 shows an example of a retention member 50, which will be described in greater detail below. The retention member 50 is provided between the outside section 30 of the inside hub 48 of the lock chassis 10 and a surface of the anti-rotation plate 22 so as to capture the anti-rotation plate 22 to the lock chassis 10. This frees an installer's hands to install the remaining portions of the assembly.

Referencing FIG. 1, an outside spring cage assembly 12 has an integrated spindle 13 that fits over the outside spindle 40 of the lock chassis 10. Internal slots of the integrated spindle 13 engage corresponding projections in the outside spindle 40 such that the integrated spindle 13 and outside spindle 40 are rotationally coupled. An outside handle 18 mounts to the end of the integrated spindle 13. A key cylinder 16 extends through the integrated spindle 13 to operate the key cam assembly 42. An outside rose 14 is attached to the outside spring cage assembly 12.

The outside spring cage assembly 12 includes threaded bosses 11 which extend through the slots 37 of the flange **36*b* and into the mounting holes 106 of the door 100. Mounting screws 32 extend through the mounting holes of the inside spring cage assembly 24, the slots 21 of the anti-rotation plate 22, and the mounting holes 106 of the door 100, where the mounting screws 32 are threaded into the threaded bosses 11 of the outside spring cage assembly 12. An inside handle 28 is attached to the end of a spindle 25 of the inside spring cage assembly 24. A rose 26 is attached to the inside spring cage assembly 24. A suitable plunger assembly (not shown) may be provided to couple the thumb turn button of the inside handle 28 to the key cam assembly 42 of the lock chassis 10**.

Referring now to FIGS. 2-5 and 9, according to certain embodiments, the gauge insert 60 is generally rectangular shape and has a longitudinal axis L that is parallel to the axis of rotation R of the door handle 18. However, the gauge insert 60 may have a variety of different shapes and sizes, such as, for example, being triangular or hexagonal, among other shapes. Additionally, the gauge insert 60 may be constructed from a variety of different materials, including, for example, plastic and rubber, among other materials.

The illustrated gauge insert 60 has four different longitudinal dimensions D1, D2, D3, D4 that are configured to accommodate doors 100 of different thicknesses. Moreover, the gauge insert 60 is removably positionable in the slot 62 of the lock chassis 10 in different orientations. The different orientations serve to align the lock chassis 10 at the correct position within the door 100. The correct position of the lock chassis 10 within the door 100 may be determined, for example, in the illustrated embodiment by the relative position of the adjustment plate 36 on the body portion 17 of the lock chassis 10. Such alignment is accomplished by providing a positive indicia or positive stop for the adjustment plate 36. The illustrated gauge insert 60 has four such positive stops 65*a*, 65*b*, 65*c*, 65*d*, with each positive stop 65*a*, 65*b*, 65*c*, 65*d*, respectively, corresponding an associated longitudinal dimension D1, D2, D3, D4.

Figure 9:
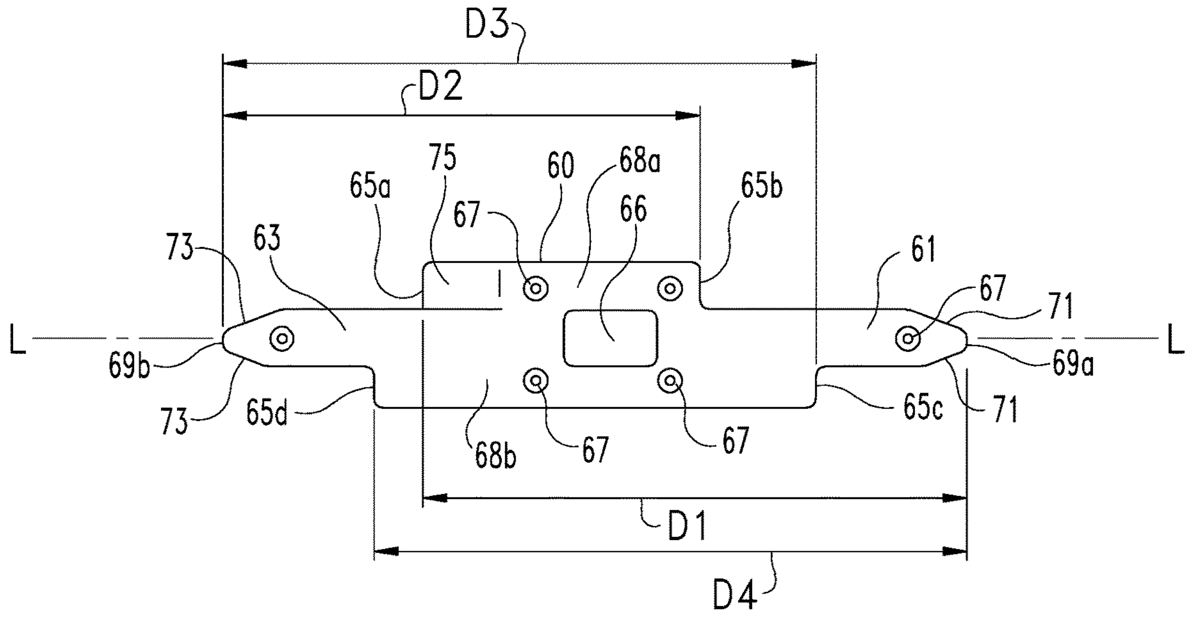
FIG. 9 is a side elevational view of a gauge insert of the lock chassis shown in FIG. 2.

In the embodiment illustrated in FIG. 9, the longitudinal dimensions D1, D2, D3, D4 are determined based on the distance of the associated positive stop 65*a*, 65*b*, 65*c*, 65*d* from an end 69*a*, 69*b* of a remote, non-adjacent leg 61, 63 of the gauge insert 60. Thus, for example, the first longitudinal dimension D1 extends from the end 69*a* of the first leg 61 to the first positive stop 65*a*, while the second longitudinal dimension D2 extends from the end 69*b* of the second leg 63 to the second positive stop 65*b*.

Referencing FIGS. 2, 3 and 5, according to the illustrated embodiment, the slot 62 of the lock chassis 10 is positioned in the periphery of the outer portion 39 of the outside housing 38 of the lock chassis 10. Further, according to certain embodiments, the length of the slot 62 is longer than the length of the gauge insert 60. The slot 62 defines two upper receiving portions 62*a* and 62*c*, and a lower receiving portion 62*b* disposed longitudinally between the two upper receiving portions 62*a*, 62*c*. The depth of the slot 62 at the lower receiving portion 62*b*, as viewed in FIG. 5, is equal to or slightly greater than the height of the positive stops 65*a*, 65*b*, 65*c*, 65*d*. The axial length of the slot 62 at the lower receiving portion 62*b* is sized to receive the longitudinal portion 68*a* of the gauge insert 60 defined between the positive stop 65*a* and the positive stop 65*b*, and to receive the longitudinal portion 68*b* of the gauge insert 60 defined between the positive stop 65*c* and the positive stop 65*d*. When the gauge insert 60 is inserted in the slot 62 with the positive stops 65*c* and 65*d* facing downward into the slot 62 and the positive stop 65*a* facing the outside (to the left in FIG. 5) and the positive stop 65*b* facing the inside (to the right in FIG. 5), the leg 61 of the gauge insert 60 rests on the first upper receiving portion 62*a* of the slot 62, and the leg 63 of the gauge insert 60 rests on the second upper receiving portion 62*c* of the slot 62. Similarly, when the gauge insert 60 is inserted in the slot 62 with the positive stops 65*a* and 65*b* facing downward into the slot 62 and the positive stop 65*c* facing the outside (to the left in FIG. 5) and the positive stop 65*d* facing the inside (to the right in FIG. 5), the leg 63 of the gauge insert 60 rests on the first upper receiving portion 62*a* of the slot 62, and the leg 61 of the gauge insert 60 rests on the second upper receiving portion 62*c* of the slot 62.

The body portion 17 of the lock chassis 10 provides an inside end wall 64 at an end of the slot 62 (upper right of FIG. 5) against which a leg 61, 63 of the gauge insert 60 abuts to stop axial movement of the gauge insert 60. In the FIG. 5 embodiment, for example, with the gauge insert 60 inserted in the slot 62, as the adjustment plate 36 is threaded on the outside housing 38 the inside edge 36*c* of the annular portion 36*a* of the adjustment plate 36 contacts the positive stop 65*a* and urges the gauge insert 60 axially toward the inside end wall 64 until the leg 61 of the gauge insert 60 abuts the inside end wall 64. The gauge insert 60 is thus sandwiched between the annular portion 36*a* of the adjustment plate 36 and the inside end wall 64 of the body portion 17 of the lock chassis 10. The positive stop 65*a* of the gauge insert 60 functions to stop further axial movement of the adjustment plate 36 and indicates to the installer that the adjustment plate 36 is in the proper axial position relative to the body portion 17 of the lock chassis 10 for a corresponding door thickness.

The depth of the slot 62 at the first upper receiving portion 62*a* is equal to or slightly greater than the height of the legs 61, 63 of the gauge insert 60. The depth of the slot 62 at the second upper receiving portion 62*c* is sized so that when the gauge insert 60 is inserted in the slot 62 and the annular portion 36*a* of the adjustment plate 36 is threaded on the outside portion 39 of the outside housing 38, at least a portion of the adjustment plate 36, such as the interior threads of the annular portion 36*a* thereof, engages the leg 61, 63 of the gauge insert 60 (leg 63 in the as shown embodiment of FIG. 5) resting on the upper receiving portion 62*c*. This engagement, which according to the illustrated embodiment is a frictional engagement, provides resistance against rotation of the adjustment plate 36, and reduces the chance that the position of the adjustment plate 36 is inadvertently changed. As shown in FIG. 9, lead-in chamfers 71, 73 can be provided at the distal ends of the legs 61, 63 to facilitate easier and more gradual threading engagement of the legs 61, 63 by the annular portion 36*a* of the adjustment plate 36. As such, the torque required to thread the adjustment plate 36 onto the outside portion 39 of the outside housing 38 increases only gradually, so that, for example, the installer can recognize that the adjustment plate 36 has not reached a stop. When the annular portion 36*a* of the adjustment plate 36 encounters a stop, for example the first positive stop 65*a* in FIG. 5, the positive stop 65*a* can serve as an indication that the correct door thickness setting has been reached.

As shown in FIG. 9, the positive stops 65*a*, 65*b*, 65*c*, 65*d*, of the illustrated gauge insert 60 are each different from the other. Referring to FIGS. 3 and 5, when the gauge insert 60 is inserted in the slot 62 of the lock chassis 10 in a first orientation corresponding to the dimension D1, the first positive stop 65*a* corresponding to a first door thickness acts as an indicator. Thus, as shown in FIGS. 3 and 5, the first positive stop 65*a* serves as an indicator as to where threading of the annular portion 36*a* of the adjustment plate 36 onto the body portion 17 of the lock chassis 10 is to be stopped to obtain an axial position of the adjustment plate 36 relative to the body portion 17 that corresponds to the first door thickness. When the gauge insert 60 is inserted in a second orientation corresponding to the dimension D2, the second positive stop 65*b* corresponding to a second door thickness acts as an indicator. When the gauge insert 60 is inserted in a third orientation corresponding to the dimension D3, the third positive stop 65*c* corresponding to a third door thickness acts as an indicator. When the gauge insert 60 is inserted in a fourth orientation corresponding to the dimension D4, the fourth positive stop 65*d* corresponding to a fourth door thickness acts as an indicator.

The positive stops 65*a*, 65*b*, 65*c*, 65*d*, may be provided with suitable indicia to indicate correspondence to for example a default door thickness, a minimum door thickness, or a maximum door thickness. For example, as shown in FIGS. 3 and 9, the positive stop 65*a* has a shape 75, namely a somewhat arrow shape 75, that is different from the shape, namely a somewhat rectangular shape, of the other positive stops 65*b*, 65*c*, 65*d*. The arrow shape 75 can provide a visual indication that, for example, the positive stop 65*a* is a default orientation for manufacturing assembly, and/or that the gauge insert 60 has been correctly oriented during the assembly process. Alternatively, the indicia for the positive stops 65*a*, 65*b*, 65*c*, 65*d* may list actual door thicknesses for each of the stops 65*a*, 65*b*, 65*c*, 65*d*, such as, for example, indicia visually indicating or representing 1¾ inches, 1⅝ inches, 2 inches, and 2⅛ inches.

The illustrated embodiment shows a single slot 62 provided in the outside housing 38 and a gauge insert 60 that can be inserted in the slot 62 in four different orientations corresponding to four different door thicknesses. However, according to certain embodiments, multiple slots 62 may be provided in the outside housing 38, for example in a circumferentially spaced manner, and each slot 62 can have a different axial length that corresponds to a respective door thickness. Further, according to certain embodiments, a gauge insert 60 may have a single longitudinal dimension. In an embodiment, a single slot 62 may be provided in the outside housing 38, and multiple gauge inserts 60 may be provided, and each gauge insert 60 may have a different axial length that corresponds to a respective door thickness.

Referring to FIG. 9, in an embodiment, the gauge insert 60 may include projections 67 that project from the sides of the gauge insert 60. The projections 67 make it easier for the installer to manipulate the gauge insert 60 to a desired orientation. Further, when the gauge insert 60 is inserted in the slot 62 of the lock chassis 10 the projections 67 function to frictionally engage the side walls of the slot 62 and resist the gauge insert 60 from being inadvertently dislodged or falling out from the slot 62. In an embodiment, the width of the slot 62 may be slightly larger than the width of the gauge insert 60 at the non-projection portions, and slightly smaller than the width of the gauge insert 60 at the projections 67 so as to facilitate an interference fit between the gauge insert 60 and the side walls of the slot 62. The projections 67 may be made of a different material than the other portions of the gauge insert 60.

The gauge insert 60 may also have a recess or hole 66 suitably sized to receive the tip of an implement such as a flat head screwdriver or the like after the gauge insert 60 has been inserted in the slot 62. The recess or hole 66 may be positioned, for example, as shown in FIG. 9 to permit access from above the slot 62. This allows the installer to easily insert the tip of the implement into the recess or hole 66 and lift the gauge insert 60 out of the slot 62. The gauge insert 60, or another gauge insert 60, may subsequently be inserted into the slot 62 in the same or a different orientation such that the gauge insert 60 is oriented for the use of the appropriate longitudinal dimension D1, D2, D3, D4 for the thickness of the associated door 100.

Referring now to FIGS. 2, 4 and 6-8, details of the illustrated retention member 50 and its cooperative anti-rotational relationship with the lock chassis 10 and the anti-rotation plate 22 will now be described. The retention member 50 may comprise a resilient material such as, for example, a plastic or rubber. The retention member 50 slides into a receptacle 47 of the inside hub 48 of the lock chassis 10 along a longitudinal axis L (FIG. 8) that is parallel to the axis of rotation R of the door handle 18. The anti-rotation plate 22 in turn slides over the inside hub 48 and the retention member 50 so that the retention member 50 frictionally engages and/or resists axial movement of the anti-rotation plate 22 relative to the inside hub 48. As such, the retention member 50 retains the anti-rotation plate 22 on the lock chassis 10 at a mount position.

Figure 7:
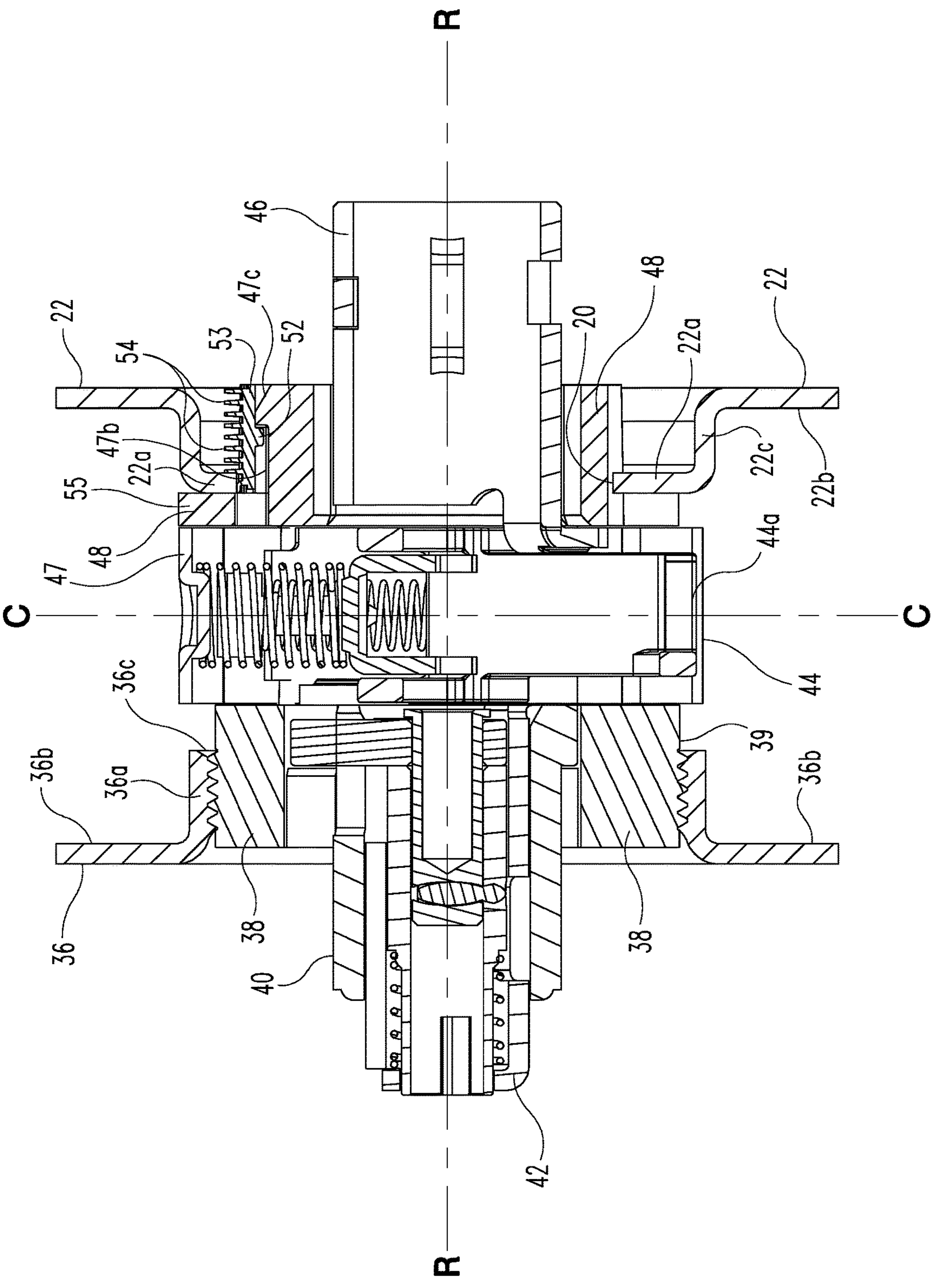
FIG. 7 illustrates a cross sectional view of a lock chassis and an anti-rotation plate as taken along line 7-7 in FIG. 6.
Figure 8:
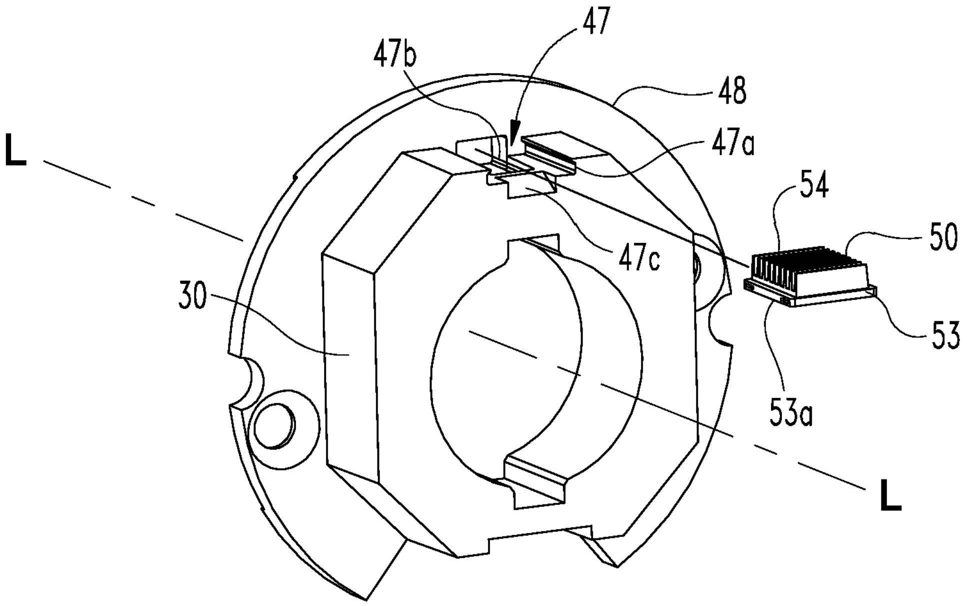
FIG. 8 is an exploded perspective view of a retention member and an inside hub of the lock chassis shown in FIG. 2.

Turning to FIG. 8, the receptacle 47 of the inside hub 48 defines a pair of opposite facing longitudinally extending channels 47*a* and a cavity 47*b* between and radially inwardly of the channels 47*a*. The receptacle 47 includes a ramp portion 47*c* axially adjacent to the cavity 47*b*. The ramp portion 47*c* has an inclined surface in the longitudinal direction from the inside to the outside or right to left in FIG. 7. The retention member 50 includes a base 53 which has opposite lip portions 53*a* that are slideable within the channels 47*a* of the receptacle 47. The retention member 50 includes a retention nodule 52 (shown in FIG. 7) that projects downward from the base 53 and is sized to fit in the cavity 47*b* of the receptacle 47.

To install the retention member 50 in the lock chassis 10, an installer slides the base 53 of the retention member 50 into the channels 47*a* of the receptacle 47 until the retention nodule 52 contacts the ramp portion 47*c*. The installer then pushes the retention member 50 to urge the retention nodule 52 over the ramp portion 47*c* and into the cavity 47*b* of the receptacle 47. Due to the resilient characteristics of the retention member 50, as the retention nodule 52 is axially urged over the ramp portion 47*c*, the retention member 50 bends or flexes slightly radially outward. As the retention nodule 52 is urged beyond the ramp portion 47*c*, the retention member 50 flexes or snaps back radially inward to its original unflexed state so that the retention nodule 52 is then captured inside the cavity 47*b*. As shown in FIG. 8, the radially outer walls of the channels 47*a* resist radially outward movement of the base 53 from the receptacle 47, and the back side of the ramp portion 47*c* resists rearward longitudinal movement (to the right in FIG. 7) of the retention nodule 52 from the cavity 47*b*. As such, the receptacle 47 secures the retention nodule 52 in the lock chassis 10.

Referring now to FIGS. 7 and 8, the retention member 50 includes a plurality of resilient members 54, which in the illustrated embodiment comprise longitudinally spaced wall members. The resilient members 54 project radially outward from the base portion 53 beyond the outside section 30 of the inside hub 48, as illustrated in the FIG. 4 embodiment. As shown in FIG. 7, the anti-rotation plate 22 includes a radially inner flange 22*a*, a radially outer flange 22*b*, and an annular portion 22*c* there between connecting the inner flange 22*a* and the outer flange 22*b*. The inner flange 22*a* has an interior opening 20 which in the illustrated embodiment is somewhat oblong octagon shaped. The interior opening 20 is shaped to correspond to the shape of the outside section 30 of the inside hub 48. The corresponding shaped interior opening 20 in the inner flange 22*a* and the outside section 30 of the inside hub 48 may have a function of ensuring that the anti-rotation plate 22 is installed on the lock chassis 10 in the proper angular orientation.

Figure 6:
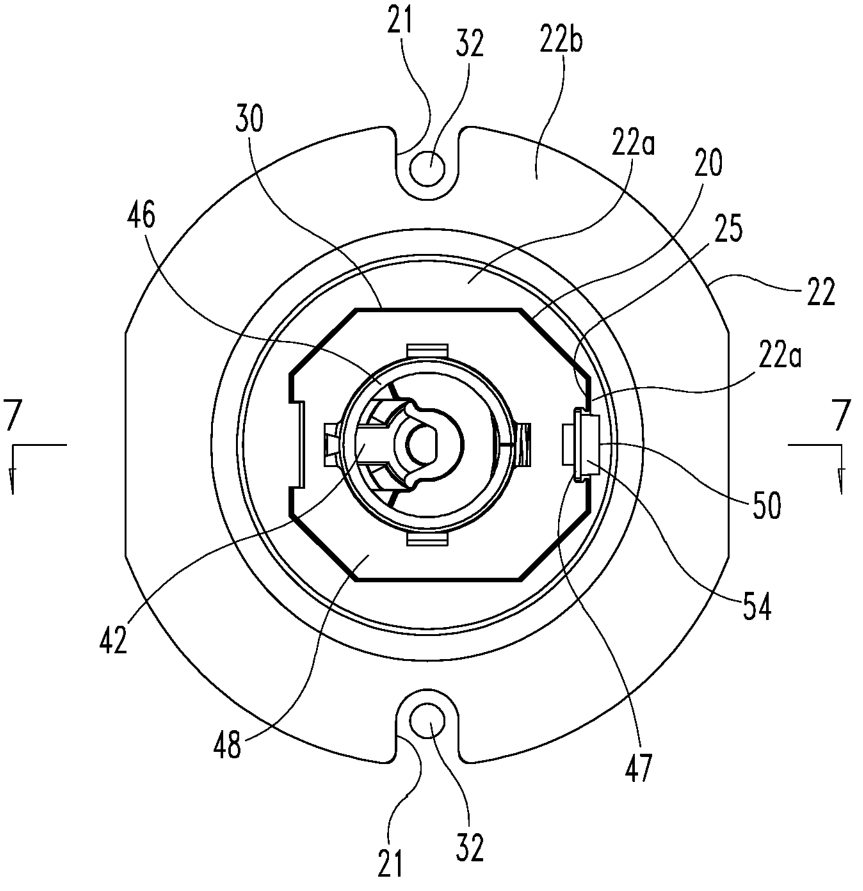
FIG. 6 illustrates an end elevational view of the lock chassis shown in FIG. 4 and includes an anti-rotation plate that is positioned on the lock chassis.

As shown in FIGS. 6 and 7, the inner flange 22*a* of the anti-rotation plate 22 at the location 25 corresponding to that of the resilient members 54 of the retention member 50 is radially inward relative to the distal ends of the resilient members 54. As such, during installation of the anti-rotation plate 22 on the inside hub 48 of the lock chassis 10, the inner flange 22*a* comes into contact with the resilient members 54. As the installer axially urges the anti-rotation plate 22 over the resilient members 54, the inner flange 22*a* bends or flexes the resilient members 54 radially inward of the inner flange 22*a* to come into frictional engagement with the resilient members 54. The resilient members 54, in turn, counteract the force exerted by the inner flange 22*a*, and exert a radially outward force against the inner flange 22*a* to come into frictional engagement with the inner flange 22*a*, and thus the anti-rotation plate 22. This frictional engagement retains the anti-rotation plate 22 on the inside hub 48 of the lock chassis 10. The installer is then free to install the remaining portions of the lock assembly 15 without concern for the lock chassis 10 disengaging from the door 100.

In the FIG. 7 embodiment, the anti-rotation plate 22 is in abutting relation with a backstop 55 of the inside hub 48. As the anti-rotation plate 22 is urged over the resilient members 54, the resilient members 54 that are axially behind the inner flange 22*a* flex or snap back radially outward to their original unflexed state. In an embodiment, these resilient members 54 resist rearward axial movement of the anti-rotation plate 22.

According to certain embodiments, the retention member 50 has no resilient members 54 near the backstop 55. Thus, there are no resilient members 54 that exert a radially outward force against the inner flange 22*a* of the anti-rotation plate 22 when the anti-rotation plate 22 is in abutting relation with the backstop 55, and instead the resilient members 54 that are axially behind the inner flange 22*a* and have flexed or snapped back radially outward to their original unflexed state, resist rearward axial movement of the anti-rotation plate 22.

In the embodiment shown in FIGS. 6-8, the inner flange 22*a* of the anti-rotation plate 22 at the location 25 corresponding to that of the resilient members 54 of the retention member 50 is substantially aligned with the radially outer wall of the channels 47*a*. The inner flange 22*a* is not limited to the form illustrated in FIGS. 1, 6 and 7; other embodiments are also contemplated herein. For example, in an embodiment, the inner flange 22*a* is not substantially aligned with the radially outer wall of the channels 47*a* and/or has a nonlinear or curved configuration.

As described, the resilient members 54 exert a force against the inner flange 22*a* to come into frictional engagement with the inner flange 22*a* to retain the anti-rotation plate 22 on the inside hub 48 of the lock chassis 10. In an embodiment, the resilient members 54 exert a force against the inner flange 22*a* such that a location of the inner flange 22*a* other than the location 25, for example a location that is diametrically opposite the location 25, comes into frictional engagement with the inside hub 48 of the lock chassis 10. Thus, the retention member 50 frictionally engages the lock chassis 10 at one location, for example location 25, and also urges the anti-rotation plate 22 into frictional engagement with the lock chassis 10 at another location. These frictional engagements together retain the anti-rotation plate 22 on the inside hub 48 of the lock chassis 10.

Any theory, mechanism of operation, proof, or finding stated herein is meant to further enhance understanding of embodiment of the present invention and is not intended to make the present invention in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While embodiments of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein of by any of the following claims are desired to be protected. It should also be understood that while the use of words such as "preferable", "preferably", "preferred" or "more preferred" utilized in the description above indicate that the feature so described may be more desirable, it nonetheless may not be necessary and embodiments lacking the same may be contemplated as within the scope of the invention, the scope being defined by the claims that follow.

The invention claimed is:

1. A lock apparatus configured for mounting to a door, the lock apparatus comprising:
- a first hub;
- a second hub coupled with the first hub;
- a slide configured to engage a latch and adapted for sliding movement relative to the first hub and the second hub;
- an adjustment plate movably mounted to the first hub for movement between a plurality of adjustment plate positions to adjust a longitudinal dimension of the lock apparatus to correspond to a particular door thickness;
- a removable gauge member configured to be installed in and removed from a position between the first hub and the adjustment plate in each of a plurality of orientations comprising a first orientation and a second orientation different from the first orientation, the removable gauge member having:
  - a first positive stop associated with a first longitudinal dimension of the removable gauge member such that when the removable gauge member is installed in the first orientation, the removable gauge member separates the adjustment plate from the first hub by a first distance corresponding to the first longitudinal dimension of the removable gauge member; and
  - a second positive stop associated with a second longitudinal dimension of the removable gauge member such that when the removable gauge member is installed in the second orientation, the removable gauge member separates the adjustment plate from the first hub by a second distance different from the first distance and corresponding to the second longitudinal dimension of the removable gauge member;
- an anti-rotation plate movably mounted to the second hub; and
- a retention member mounted to the second hub, wherein the retention member is configured to resist movement of the anti-rotation plate relative to the second hub.

2. The lock apparatus of claim 1, wherein the removable gauge member comprises a first end and a second end opposite the first end;
- wherein when the removable gauge member is installed in the first orientation, the first positive stop is engaged with the adjustment plate and one of the first and second ends is engaged with the first hub;

wherein when the removable gauge member is installed in the second orientation, the second positive stop is engaged with the adjustment plate and one of the first and second ends is engaged with the first hub;

wherein the longitudinal dimension of the lock apparatus is a first longitudinal dimension when the removable gauge member is installed in the first orientation;

wherein the longitudinal dimension of the lock apparatus is a second longitudinal dimension when the removable gauge member is installed in the first orientation; and wherein the first longitudinal dimension is different from the second longitudinal dimension.

3. The lock apparatus of claim 2, wherein the first end and the second end are offset from one another along a longitudinal axis of the removable gauge member; and wherein the first orientation and the second orientation are rotationally offset from one another by 180° about the longitudinal axis.

4. The lock apparatus of claim 1, further comprising:

an first spindle rotatably coupled with the first hub;

an second spindle rotatably coupled with the second hub;

a first handle engaged to the first spindle; and a second handle engaged to the second spindle.

5. The lock apparatus of claim 4, further comprising a key cylinder associated with one of the first and second spindles.

6. The lock apparatus of claim 1, wherein the first hub comprises a first hub slot; and wherein the removable gauge member is mounted in the first hub slot in each of a first orientation and a second orientation.

7. The lock apparatus of claim 1, wherein the second hub comprises a receptacle; and wherein the retention member is mounted in the receptacle.

8. A lock apparatus configured for mounting to a door, the lock apparatus comprising:

a first hub;

a second hub coupled with the first hub;

a slide configured to engage a latch and adapted for sliding movement relative to the first hub and the second hub;

an adjustment plate movably mounted to the first hub for movement between a plurality of adjustment plate positions to adjust a longitudinal dimension of the lock apparatus to correspond to a particular door thickness;

a removable gauge member configured to be installed in and removed from a position between the first hub and the adjustment plate, the removable gauge member having:

a first positive stop associated with a first longitudinal dimension of the removable gauge member; and a second positive stop associated with a second longitudinal dimension of the removable gauge member;

an anti-rotation plate movably mounted to the second hub;

a retention member mounted to the second hub, wherein the retention member is configured to resist movement of the anti-rotation plate relative to the second hub;

a first spring cage positioned adjacent the first hub;

a second spring cage positioned adjacent the second hub;

a first handle engaged to the first spring cage; and a second handle engaged to the second spring cage.

9. The lock apparatus of claim 8, wherein the removable gauge member is operable to be installed between the adjustment plate and the first hub in each of a plurality of orientations comprising a first orientation and a second orientation;

wherein each positive stop is configured to engage the adjustment plate such that:

when the removable gauge member is installed in the first orientation, the removable gauge member separates the adjustment plate from the first hub by a first distance corresponding to the first longitudinal dimension of the removable gauge member; and when the removable gauge member is installed in the second orientation, the removable gauge member separates the adjustment plate from the first hub by a second distance different from the first distance and corresponding to the second longitudinal dimension of the removable gauge member.

10. The lock apparatus of claim 9, wherein the longitudinal dimension of the lock apparatus is a first longitudinal dimension when the removable gauge member is installed in the first orientation;

wherein the longitudinal dimension of the lock apparatus is a second longitudinal dimension when the removable gauge member is installed in the first orientation; and wherein the first longitudinal dimension is different from the second longitudinal dimension.

11. A lock apparatus configured for mounting to a door, the lock apparatus comprising:

a first hub;

a second hub coupled with the first hub;

a slide configured to engage a latch and adapted for sliding movement relative to the first hub and the second hub;

an adjustment plate movably mounted to the first hub for movement between a plurality of adjustment plate positions to adjust a longitudinal dimension of the lock apparatus to correspond to a particular door thickness;

a removable gauge member configured to be installed in and removed from a position between the first hub and the adjustment plate, the removable gauge member having:

a first positive stop associated with a first longitudinal dimension of the removable gauge member; and a second positive stop associated with a second longitudinal dimension of the removable gauge member;

an anti-rotation plate movably mounted to the second hub; and a retention member mounted to the second hub, wherein the retention member is configured to resist movement of the anti-rotation plate relative to the second hub; and wherein the retention member comprises a plurality of flexible members resiliently engaging the anti-rotation plate to resist movement of the anti-rotation plate relative to the second hub.

12. The lock apparatus of claim 11, wherein the plurality of flexible members are configured to resiliently bend when engaged by the anti-rotation plate.

13. A lock apparatus configured for mounting to a door, the lock apparatus comprising:

a lock body;

an adjustment plate adjustably mounted to the lock body and movable relative to the lock body between a plurality of positions to adjust a longitudinal dimension of the lock apparatus to correspond to a particular door thickness; and a removable gauge member configured to be installed in and removed from a position between the lock body and the adjustment plate, the removable gauge member having a first longitudinal dimension and a second longitudinal dimension;

wherein the removable gauge member is operable to be installed between the adjustment plate and the lock body in a first orientation which separates the adjustment plate from the lock body by a first distance corresponding to the first longitudinal dimension of the removable gauge member; and wherein the removable gauge member is operable to be installed between the adjustment plate and the lock body in a second orientation which separates the adjustment plate from the lock body by a second distance different from the first distance and corresponding to the second longitudinal dimension of the removable gauge member.

14. The lock apparatus of claim 13, wherein the removable gauge member comprises a first end and a second end opposite the first end;

wherein when the removable gauge member is installed in the first orientation, a first stop is engaged with the adjustment plate and one of the first and second ends is engaged with the lock body; and wherein when the removable gauge member is installed in the second orientation, a second stop is engaged with the adjustment plate and one of the first and second ends is engaged with the lock body.

15. The lock apparatus of claim 13, wherein the longitudinal dimension of the lock apparatus is a first longitudinal dimension when the removable gauge member is installed in the first orientation;

wherein the longitudinal dimension of the lock apparatus is a second longitudinal dimension when the removable gauge member is installed in the first orientation; and wherein the first longitudinal dimension is different from the second longitudinal dimension.

16. The lock apparatus of claim 13, further comprising:

an first spindle rotatably coupled with the lock body;

an second spindle rotatably coupled with the lock body;

a first handle engaged to the first spindle; and a second handle engaged to the second spindle.

17. The lock apparatus of claim 16, further comprising a key cylinder associated with one of the first and second spindles.

18. A lock apparatus configured for mounting to a door, the lock apparatus comprising:

a lock body;

an adjustment plate adjustably mounted to the lock body and movable relative to the lock body between a plurality of positions to adjust a longitudinal dimension of the lock apparatus to correspond to a particular door thickness;

a removable gauge member configured to be installed in and removed from a position between the lock body and the adjustment plate, the removable gauge member having a first longitudinal dimension and a second longitudinal dimension;

a first spring cage;

a second spring cage;

a first handle engaged to the first spring cage; and a second handle engaged to the second spring cage;

wherein the removable gauge member is operable to be installed between the adjustment plate and the lock body in a first orientation which separates the adjustment plate from the lock body by a first distance corresponding to the first longitudinal dimension of the removable gauge member; and wherein the removable gauge member is operable to be installed between the adjustment plate and the lock body in a second orientation which separates the adjustment plate from the lock body by a second distance different from the first distance and corresponding to the second longitudinal dimension of the removable gauge member.

* * * * *